Feb. 16, 1965  W. H. THOMPSON  3,169,259
PIPE FOLLOWER INSERT
Filed Oct. 24, 1962
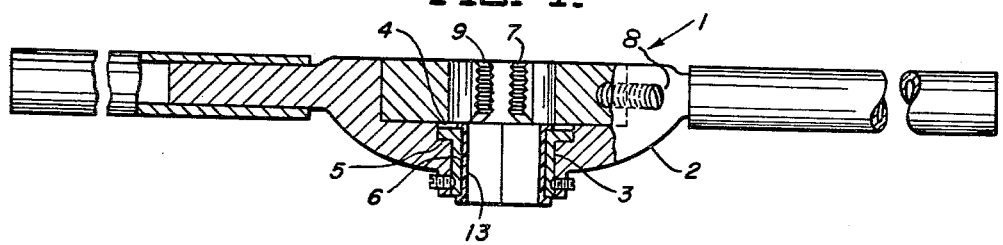
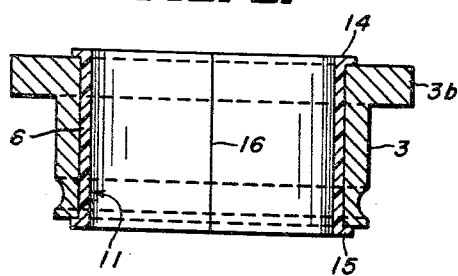
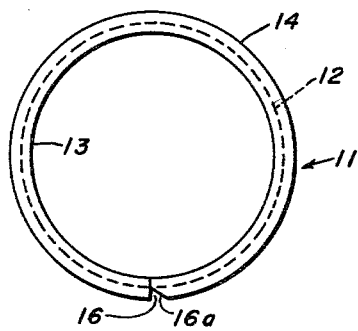
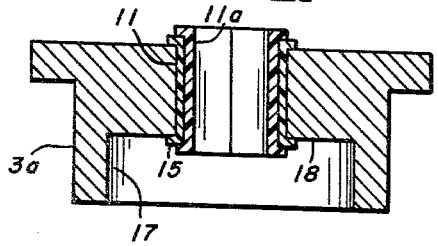
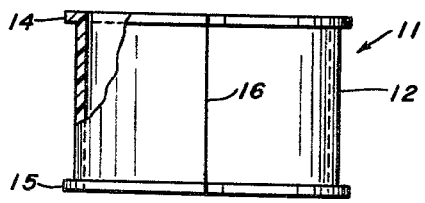
INVENTOR.
WILLIAM H. THOMPSON
By
Christy, Parmelee & Strickland.
Attorneys

3,169,259
PIPE FOLLOWER INSERT
William H. Thompson, 22 Chapel Drive S., R.D. 3, Wexford, Pa.
Filed Oct. 24, 1962, Ser. No. 232,731
1 Claim. (Cl. 10—127)

The present invention relates generally to pipe threading and, more specifically, to pipe followers of pipe threading devices affording protection to the plated external surfaces of pipes during this threading operation.

Pipes employed for conveying fluids in multi-story commercial buildings as well as in residences are customarily cut to length, threaded and fitted at the situs. This for the reason that the exact length of pipe cannot be determined from blueprints or building plans, so as to be precut in factories or jobbing shops employing large and expensive equipment for threading pipe and protection of the plated surfaces thereon, especially exposed piping.

When on the job or situs pipe threading and fitting is practiced, there is customarily employed workmen of varying skill and temperament. Additionally, the quality of threading equipment varies widely. As a result, several types of hand tools employed in the fitting-up of pipe are available and customarily used to prevent marring of the plated exterior of the pipe. Pipe threading equipment providing similar protection during the threading of pipe is not customarily employed nor in such equipment readily obtainable upon the market.

An object of the invention is to provide a readily attachable liner for the customary pipe follower employed in pipe threading tools, affording complete protection for the plated external surfaces of pipes during the threading of the ends thereof.

Another object of the invention is to provide liners of the class described which may be telescopically assembled upon followers to afford proper fit and protection for the said pipe surfaces when the precise follower size is not available.

These and other objects of the invention will be made apparent from the following description of the invention and the drawing forming a part thereof, wherein:

FIG. 1 shows a cross-section through a conventional type of pipe threading tool employing a pipe follower;

FIG. 2 shows a vertical cross-section through the pipe follower of FIG. 1 and the liner of the invention mounted therein;

FIG. 3 shows a plan view of the liner;

FIG. 4 shows a side elevation of the liner; and

FIG. 5 shows a vertical cross-section through a modified form of follower and liner.

Referring now in detail to the drawing (FIG. 1), the pipe threading tool, indicated generally at 1, employs a body portion 2 of suitable design having a central passageway therethrough receiving a pipe follower 3 provided with an external flange 4 seating in the recess 5 of the body to retain the follower in assembled relation with the said body. The follower 3 customarily has an opening 6 therethrough to receive a standard size pipe, not shown, inserted through the follower into the threading die disposed above the follower. The follower opening 6 closely approximates the exterior diameter of the pipe permitting relative movement of the pipe into the die and support for the pipe to prevent deflection thereof during the threading operation.

The threading die 7 is detachably mounted in the body portion 1 adjacent follower 3 and may be held therein by any suitable means, such as the screw member 8. Centrally of die 7 are suitable thread cutting members 9 alined with the opening 6 of follower 3 to cut the required threads on the pipe as the pipe within the follower is pushed into the cutting members 9 as the body portion 1 is rotated about the pipe by handles 10 at opposite sides of the body.

The foregoing is conventional practice with conventional tools employed in threading pipe and forms no part of the invention. It will be apparent, however, that rotation of the pipe follower in moving relative to the pipe will readily mar the plated outer surface of the contained pipe.

Referring now to FIGS. 2, 3 and 4 of the drawing, the follower 3 has mounted within the opening 6 thereof a pipe surface protective liner indicated generally as 11. The liner 11 has a cylindrical body portion 12 having an opening 13 therethrough and is provided with top flange 14 and bottom flange 15. The body 12 and flanges 14 and 15 are cut through at 16. Liner flanges 14, 15 serve to retain the liner in fixed relation within the follower by engagement therewith, as shown in FIG. 2.

The pipe with which the invention is used is commercially available in standard sizes. The followers are commercially available and are directly related to the pipe sizes. Hence the combination of a standard size follower and the liner of the invention results in a reduction of the size of pipe which can be received by the lined follower. In other words a standard metal follower for 1" pipe when containing the liner of the invention will accept only the next smaller size pipe or even a still smaller size pipe, depending upon the thickness of the liner body portion 12.

The above relationship between follower and liner may be advantageously employed to adapt one follower for a given size pipe to a plurality of smaller size pipes. Thus a follower having a central opening adapted for reception of a maximum size pipe of say 1" pipe, when proved with a first liner 11 will now receive only the next smaller size pipe. However, should a second smaller size liner 11a (FIG. 5) be mounted within the first liner 11, then the specific size follower may be selectively adjusted to receive either of two smaller sized pipes depending upon the number and size of plural liners used.

It will be understood that the threading tool body 2 requires all followers used therewith to have fixed exterior dimensions and a follower accepting a maximum size pipe has exterior dimensions the same as a follower accepting the minimum size pipe to be threaded by such tool. Hence, when the liner 11 has a body thickness such as to modify the follower to accept only the next smaller size pipe, a second and smaller liner 11a mounted in the same size follower already equipped with a liner 11 will now accept the next smaller size pipe. This is of advantage where a specific size follower may not be available, but can be replaced by a larger size follower equipped with two or more liners of the invention.

The liners 11 may be formed from any suitable flexible material, preferably a plastic such as Teflon, polyethylene or other type plastics having sufficient flexibility and a surface softer than the nickel or chromium surface of the plated pipe received therein. The liner 11 may be inserted or removed from the follower by inwardly depressing the liner at one side of the cut 16 therein and collapsing the liner. To facilitate the collapsing movement, one side of flanges 14 and/or 15 may be chamfered as at 16a to readily slide over the adjacent face of the flange 14 during the collapsing or erecting movement.

Although liner 11 is shown with two flanges 14 and 15, it will be apparent that one flange 15 may be omitted where the thread cutting elements 7 would prevent upward displacement of liner 11 and flange 14 would prevent downward displacement of the liner when the pipe is withdrawn. It is further recognized that some followers, such as 3a of FIG. 5 have a recess 17 therein so that the liner flange 15 would abut against surface 18. Hence the liners 11 would need to be of different lengths when used with the two types of followers 3 and 3a.

It will also be recongnized by those skilled in the art that a liner such as disclosed and claimed herein when employed with a follower to reduce the pipe size received within the follower, could also be made of a size to replace the follower. Many pipe threading devices having a stock which embraces the follower in a manner similar to that shown in FIG. 1 of the drawing. It will be apparent, therefore, that the follower 3 could be removed and a liner of the invention having an O.D. and an I.D. same as the follower could be used to replace the follower. In such an event the top flange 14 or both flanges 14 and 15 could be of a suitable thickness and shape to simulate the flange 3b of the displaced follower.

I claim:

In combination, a pipe threading tool having a body portion provided with a recess in one face thereof receiving a threading die, an aperture through the opposite face of said body portion and communicating with said recess, a pipe follower mounted in said aperture and provided with a cylindrical passageway therethrough for reception of an end of a pipe to be threaded, and a liner disposed within said passageway, said liner comprising a hollow cylindrical semiflexible body portion having an inner surface non-marring to the surface of a pipe moving therethrough an an outer diameter not greater than that of the passageway through said follower, a laterally outward extending flange defining one end of said liner body portion for overlapping the adjacent end of the pipe follower passageway and aligned cuts through said flange and the length of said liner body portion.

References Cited by the Examiner
UNITED STATES PATENTS

| | | | |
|---|---|---|---|
| 696,299 | 3/02 | Baines | 10—127 |
| 1,420,847 | 6/22 | Konigsberg | 10—127 |
| 1,671,580 | 5/28 | Greve | 285—55 |
| 2,518,851 | 8/50 | Anderson | 16—2 |
| 3,016,562 | 1/62 | Reid | 16—2 |

FOREIGN PATENTS 265,263   3/50   Switzerland.

ANDREW R. JUHASZ, *Primary Examiner.*